Nov. 26, 1968 G. W. HOWARD 3,412,769
ROLLING EQUIPMENT
Filed April 12, 1965

INVENTOR
G. W. HOWARD
BY
Holcombe, Wetherill & Brisebois
ATTORNEYS

United States Patent Office 3,412,769
Patented Nov. 26, 1968

3,412,769
ROLLING EQUIPMENT
George William Howard, Kirkella, England, assignor to Rose, Downs & Thompson Limited, Kingston-upon-Hull, Yorkshire, England, a British company
Filed Apr. 12, 1965, Ser. No. 447,399
3 Claims. (Cl. 146—1)

ABSTRACT OF THE DISCLOSURE

Rolling equipment for crushing or flaking vegetable or other matter consists of a pair of cylindrical rolls rotating in opposite directions with at narrow gap between the roll surfaces through which the matter is forced. One roll is driven faster than the other roll with a free-wheeling device in the roll drive means to prevent abnormal rolling pressures from developing.

---

This invention relates to rolling equipment and is concerned particularly but not exclusively with rolls for crushing or flaking vegetables and other matter, as for example in the treatment of that matter for the extraction of oil.

Such rolling equipment consists essentially of a pair of cylindrical rolls rotating in opposite directions, the roll shaft bearings being adjustably located so as to leave a narrow gap between the roll surfaces through which the material is forced by the rotation of the rolls.

There are three basic ways in which the two rolls may be driven, namely: individual drive to each; or drive to one only with interconnection between the shafts to drive the second roll; or drive to one only without any interconnection so that the second roll is an idler driven by friction either through contact between the two roll surfaces or through the material entering the roll nip.

This specification is not concerned with the case where the two roll surfaces are required to run at dissimilar speeds in some fixed ratio to exert a shearing or grinding action on material passing through. In such a case individual drives or a suitable ratio interconnection must be used.

In the case, where virtually equal surface speeds are used, as in a flaking process, the use of one powered roll and one idler is attractive. However, since direct metal-to-metal contact between the two roll surfaces may eventually lead to surface troubles such as spalling and chipping, it is an advantage if this direct contact is prevented by means of stops between the bearing housings or the like. With this arrangement, rotation of the idler roll is dependent upon the frictional drive from the surface of the powered roll to the idler roll surface through the material in the nip; at times when no material is passing the idler roll will slow down and eventually stop. Starting up or restarting involves considerable skidding of material over the two surfaces as the inertia of the idler roll is overcome, causing abrasion and wear.

To minimize this abrasion, a light interconnecting drive could be used to maintain equal speeds of the two rolls, only of sufficient capacity to accelerate the "idler" roll nip to a speed during initial starting up. However, with any inter-shaft connection, a narrow difference in surface speeds of the two rolls may develop due to unequal regrinding, and very high loads can be induced to the elements of the drive at high rolling pressures and with a high coefficient or friction in the roll gap. For the drive to be able to withstand those loads under such developing close differential speed conditions, it has to be of large proportions and becomes expansive and may be difficult to accommodate.

The object of the present invention is to provide an arrangement in which these abnormal loads cannot develop, so that a light inter-roll drive can be used. Accordingly the invention provides a pair of rotatable rolls, a first of which is arranged to be driven from an external drive means, and the second of which is arranged to be positively driven by the first roll, in the opposite direction to the direction of rotation of the first roll, through a free-wheeling device, arranged such that the second roll can over-run the drive from the first roll.

Preferably, the drive from the first roll to the second roll is such as to drive the second roll at a slightly slower speed than that of the first roll.

For example, assuming that no more than (say) 5% difference in diameters between the two rolls could develop after regrinds, the powered shaft would be arranged to drive the "idler" shaft at about 95% of its own speed. Thus, the "idler" roll surface speed could never be less than (say) 95% of the powered roll speed at any time with equal roll diameters; introduction of a feed material into the roll nip would only have to increase the surface speed of the "idler" by only about 5% by the frictional effect the "idler" would slightly over-run the drive which would merely run light with the material in the nip taking over the driving. Subsequent changes in diameters of the rolls could only affect the rate at which the "idler" roll over-runs the drive.

This invention will be more readily understood from the following description of an inter-roll drive arrangement, given by way of example, with reference to the accompanying drawings, of which:

Figure 1:
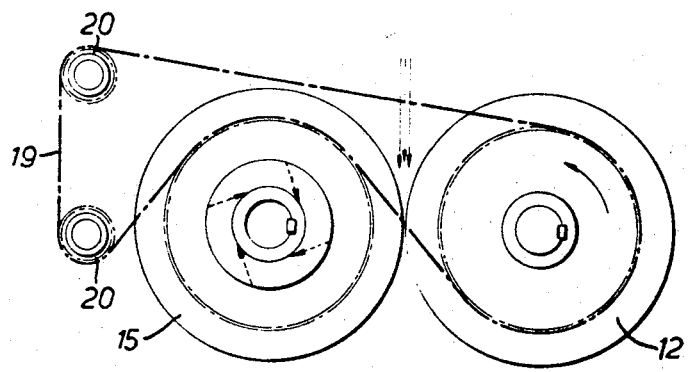
FIGURE 1 is a simplified side view of an interconnecting drive between roll shafts.
Figure 2:
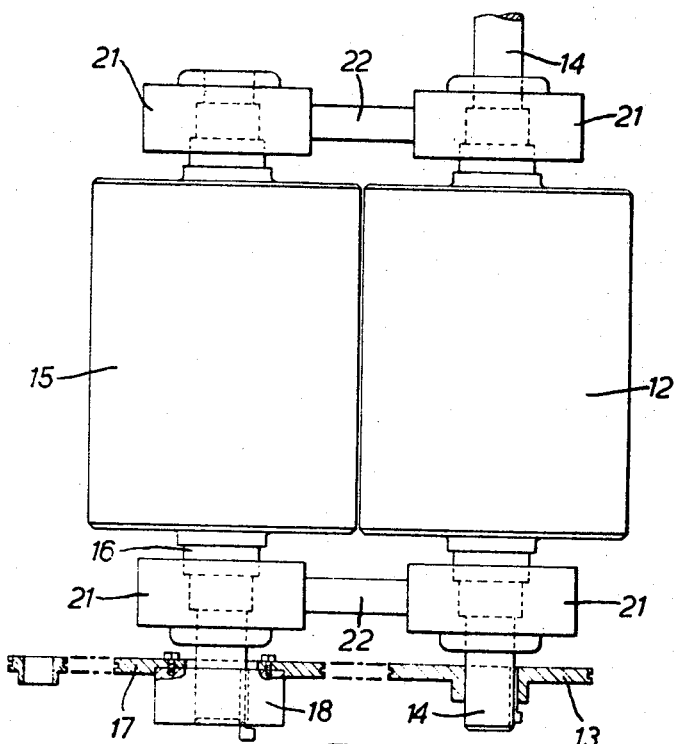
FIGURE 2 is a plan view of a pair of rolls and shafts connected by a drive of the type shown in FIGURE 1.

A powered roll body 12 and chain sprocket 13 are rigidly connected to a powered roll shaft 14 and rotate with it when the shaft 14 is driven by an external drive motor of any conventional form. An "idling" roll body 15 is similarly connected rigidly to an "idling" shaft 16, but chain sprocket 17 is mounted on shaft 16 through the medium of a free-wheeling device 18, arranged to transmit the drive to a shaft 16 in clockwise sense only, as shown in FIGURE 1. The two sprockets 13 and 17 are connected by a continuous roller chain 19 passing also around jockey pulleys 20 so as to produce clockwise rotation in sprocket 17 from counter clockwise rotation of sprocket 13. Sprocket 13 has fewer teeth than sprocket 17, selected so that sprocket 17 will have for example, 5% less rotational sweep than sprocket 13. The two roll bodies 12 and 15 are of nominally equal diameters.

The two shafts are journalled in bearings in housings 21 which are spaced by an inner stop 22 to leave a gap between the adjacent roll surfaces.

It will be apparent that the free-wheeling device 18 transmits the drive positively to "idler" roll 15 on starting up and thence forward maintains its speed at slightly less than that of roll 12. It will be apparent also that "idler" roll 15 can at all times over-run this drive as required when the drive is transferred through the roll surfaces via material entering the nip, and that the diameters of the two rolls may become different within the specified limits without imposing abnormal loads in the system.

The free-wheeling device 18 may be of any familar type, for example ratchet, roller or sprag types.

The inter-shaft connecting drive has been described and illustrated as using roller chain and sprockets, by any other system could be substituted, for example intermeshing gearwheels of a suitable ratio.

I claim:

1. In rolling equipment comprising a driving roll and a driven roll between which rolls material to be treated is to be passed, positive drive means permanently engaged between said rolls and through which said driving roll drives said driven roll at a peripheral speed less than that of said driving roll, the improvement consisting of:

a free-wheeling device included in said positive drive means and permitting said driven roll to rotate faster than the speed at which it is driven by said positive drive means, when driven from said driving roll through material between said rolls.

2. Rolling equipment according to claim 1 in which said rolls are mounted on shafts and the drive means is arranged to drive the driven roll shaft at about 95% of the speed of the driving roll shaft.

3. Rolling equipment according to claim 1 in which said drive means includes a first chain sprocket mounted on the driving roll shaft, a second chain sprocket mounted on the drive roll shaft through the free-wheeling device, and a continuous chain so engaging the sprockets as to produce rotation of the rolls in opposite directions.

References Cited

UNITED STATES PATENTS

| | | | |
|---|---|---|---|
| 2,086,659 | 7/1937 | Armstrong | 241—230 |
| 2,316,131 | 4/1943 | Cardwell | 74—217 |
| 2,481,201 | 9/1949 | Collier | 241—234 |

JAMES M. MEISTER, *Primary Examiner.*